US011475660B2

(12) United States Patent
Guo

(10) Patent No.: US 11,475,660 B2
(45) Date of Patent: Oct. 18, 2022

(54) METHOD AND SYSTEM FOR FACILITATING RECOGNITION OF VEHICLE PARTS BASED ON A NEURAL NETWORK

(71) Applicant: Alibaba Group Holding Limited, Grand Cayman (KY)

(72) Inventor: Qingpei Guo, Beijing (CN)

(73) Assignee: Advanced New Technologies Co., LTD., George Town (KY)

( * ) Notice: Subject to any disclaimer, the term of this patent is extended or adjusted under 35 U.S.C. 154(b) by 638 days.

(21) Appl. No.: 16/555,790

(22) Filed: Aug. 29, 2019

(65) Prior Publication Data
US 2020/0074178 A1 Mar. 5, 2020

(30) Foreign Application Priority Data
Aug. 31, 2018 (CN) .......................... 201811014381.3

(51) Int. Cl.
*G06K 9/00* (2022.01)
*G06V 20/20* (2022.01)
(Continued)

(52) U.S. Cl.
CPC ............. *G06V 20/20* (2022.01); *G06N 3/049* (2013.01); *G06Q 10/20* (2013.01); *G06Q 40/08* (2013.01); *G06V 10/255* (2022.01)

(58) Field of Classification Search
CPC .... G06N 3/0445; G06N 3/0454; G06N 3/049; G06N 3/08; G06N 7/005; G06Q 10/20;
(Continued)

(56) References Cited

U.S. PATENT DOCUMENTS 6,397,334 B1 5/2002 Chainer
6,925,452 B1 8/2005 Hellerstein
(Continued)

FOREIGN PATENT DOCUMENTS

WO 2017059576 4/2017
WO 2018055340 3/2018

OTHER PUBLICATIONS

Yuan, Peng, Yangxin Zhong, and Yang Yuan. "Faster r-cnn with region proposal refinement." Tech. Rep. (2017). (Year: 2017).*
(Continued)

*Primary Examiner* — Avinash Yentrapati
(74) *Attorney, Agent, or Firm* — Yao Legal Services, Inc.; Shun Yao

(57) ABSTRACT

One embodiment facilitates recognizing parts of a vehicle. A convolution module is configured to generate a convolution feature map of a vehicle image. A region proposal module is configured to determine, based on the convolution feature map, one or more proposed regions, wherein a respective proposed region corresponds to a target of a respective vehicle part. A classification module is configured to determine a class and a bounding box of a vehicle part corresponding to a proposed region based on a feature of the proposed region. A conditional random field module is configured to optimize classes and bounding boxes of the vehicle parts based on correlated features of the corresponding proposed regions. A reporting module is configured to generate a result which indicates a list including an insurance claim item and corresponding damages based on the optimized classes and bounding boxes of the vehicle parts.

20 Claims, 9 Drawing Sheets

(51) Int. Cl.
  *G06N 3/04*  (2006.01)
  *G06Q 10/00* (2012.01)
  *G06Q 40/08* (2012.01)
  *G06V 10/20* (2022.01)

(58) Field of Classification Search
  CPC ...... G06Q 40/08; G06V 10/25; G06V 10/255;
       G06V 10/454; G06V 10/82; G06V 20/00;
       G06V 20/20
  See application file for complete search history.

(56) References Cited

U.S. PATENT DOCUMENTS

| | | | |
|---|---|---|---|
| 7,093,129 B1 | 8/2006 | Gavagni | |
| 7,401,012 B1 | 7/2008 | Bonebakker | |
| 7,872,584 B2 | 1/2011 | Chen | |
| 8,180,629 B2 | 5/2012 | Rehberg | |
| 8,448,226 B2 | 5/2013 | Narasimhan | |
| 8,966,613 B2 | 2/2015 | Horvitz | |
| 9,036,943 B1 | 5/2015 | Baldwin | |
| 9,582,843 B2 | 2/2017 | Leonard | |
| 9,607,138 B1 | 3/2017 | Baldwin | |
| 10,380,741 B2* | 8/2019 | Yedla | G06N 3/0454 |
| 10,475,014 B1 | 11/2019 | Ramalingam | |
| 10,554,738 B1 | 2/2020 | Ren | |
| 10,713,794 B1* | 7/2020 | He | G06N 3/0454 |
| 2001/0046659 A1 | 11/2001 | Oster | |
| 2002/0136459 A1 | 9/2002 | Imagawa | |
| 2003/0229789 A1 | 12/2003 | Morais | |
| 2004/0167765 A1 | 8/2004 | Abu El Ata | |
| 2004/0196363 A1 | 10/2004 | Diamond | |
| 2005/0232424 A1 | 10/2005 | Dobranski | |
| 2009/0087025 A1 | 4/2009 | Ma | |
| 2009/0206993 A1 | 8/2009 | Di Mambro | |
| 2010/0128923 A1 | 5/2010 | Kiya | |
| 2010/0135490 A1 | 6/2010 | Kwon | |
| 2011/0069892 A1 | 3/2011 | Tsai | |
| 2011/0162679 A1 | 7/2011 | Demmeler | |
| 2012/0269346 A1 | 10/2012 | Best | |
| 2013/0015946 A1 | 1/2013 | Lau | |
| 2013/0182002 A1 | 7/2013 | Macciola | |
| 2013/0208103 A1 | 8/2013 | Sands | |
| 2014/0037184 A1 | 2/2014 | Gorski | |
| 2014/0270411 A1 | 9/2014 | Shu | |
| 2014/0309805 A1 | 10/2014 | Ricci | |
| 2014/0313334 A1 | 10/2014 | Slotky | |
| 2015/0036891 A1 | 2/2015 | Takenouchi | |
| 2015/0103170 A1 | 4/2015 | Nelson | |
| 2015/0110364 A1 | 4/2015 | Niinuma | |
| 2015/0110366 A1 | 4/2015 | Sezille | |
| 2015/0341370 A1 | 11/2015 | Khan | |
| 2016/0034786 A1 | 2/2016 | Suri | |
| 2016/0044030 A1 | 2/2016 | Galwas | |
| 2016/0063235 A1 | 3/2016 | Tussy | |
| 2016/0225053 A1* | 8/2016 | Romley | G06Q 30/0623 |
| 2016/0283787 A1 | 9/2016 | Nepomniachtchi | |
| 2016/0307029 A1 | 10/2016 | Vaknin | |
| 2017/0048244 A1 | 2/2017 | Loughlin-Mchugh | |
| 2017/0060867 A1 | 3/2017 | Moutinho | |
| 2017/0061563 A1 | 3/2017 | Falkenstern | |
| 2017/0148102 A1 | 5/2017 | Franke | |
| 2017/0293894 A1* | 10/2017 | Taliwal | G06V 10/462 |
| 2017/0300828 A1 | 10/2017 | Feng | |
| 2018/0018391 A1 | 1/2018 | Kaji | |
| 2018/0025249 A1* | 1/2018 | Liu | G06K 9/628 |
| | | | 382/158 |
| 2018/0047208 A1 | 2/2018 | Marin | |
| 2018/0083973 A1 | 3/2018 | Paraskevas | |
| 2018/0137642 A1* | 5/2018 | Malisiewicz | G06T 7/11 |
| 2018/0182039 A1 | 6/2018 | Wang | |
| 2018/0247112 A1 | 8/2018 | Norimatsu | |
| 2018/0260793 A1 | 9/2018 | Li | |
| 2018/0300576 A1 | 10/2018 | Dalyac | |
| 2018/0342077 A1* | 11/2018 | Tsuno | G06V 10/82 |
| 2019/0035112 A1 | 1/2019 | Lee | |
| 2019/0064841 A1* | 2/2019 | Tong | G05D 1/0212 |
| 2019/0073641 A1 | 3/2019 | Utke | |
| 2019/0156178 A1 | 5/2019 | Thornton | |
| 2019/0266015 A1 | 8/2019 | Chandra | |
| 2019/0294878 A1 | 9/2019 | Endras | |
| 2019/0355366 A1 | 11/2019 | Ng | |
| 2020/0005151 A1 | 1/2020 | Jiang | |
| 2020/0027207 A1* | 1/2020 | Zhang | G06V 10/82 |
| 2020/0034958 A1 | 1/2020 | Campbell | |
| 2020/0050939 A1 | 2/2020 | Zhu | |
| 2020/0051237 A1 | 2/2020 | Spivey | |
| 2020/0117937 A1* | 4/2020 | Lee | G06N 3/0454 |
| 2020/0175352 A1* | 6/2020 | Cha | G06N 3/04 |
| 2020/0250450 A1* | 8/2020 | Kim | G05D 1/0238 |
| 2020/0349370 A1 | 11/2020 | Lambert | |
| 2020/0356718 A1* | 11/2020 | Chu | G06N 3/0454 |

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.

Zhou Huabing et al.: "Image Classification Based on Region of Interest Detection", Visual Communications and Image Processing; Jan. 20, 2004; San Jose; vol. 9813, Dec. 14, 2015, pp. 9813OU-9813OU, XP060063208, paragraph [0001]; figure 1.

W. Samek, T. Wiegand, and K.-R. Muller. (2017). Explainable artificial Intelligence: understanding, visualizing and interpreting deep learning models.: [Online], Available: https://arxiv.org/abs/1708.08296 (Year: 2017).

Jeffery De Dejin, ("Automatic car damage recognition using convolutional neural networks", Internship report MSc Business Analytics Mar. 29, 2018, pp. 1-53, Vrije Universiteit Amsterdam Faculty of Science, Amsterdam)(Year:2018).

* cited by examiner

METHOD AND SYSTEM FOR FACILITATING RECOGNITION OF VEHICLE PARTS BASED ON A NEURAL NETWORK

RELATED APPLICATION

Under 35 U.S.C. 119, this application claims the benefit and right of priority of Chinese Patent Application No. 201811014381.3, filed on 31 Aug. 2018.

BACKGROUND

Field

This disclosure is generally related to the technical field of artificial intelligence and machine learning. More specifically, this disclosure is related to a method and system for facilitating recognition of vehicle parts based on a neural network.

Related Art

In conventional vehicle damage assessment approaches, a vehicle insurance company can send a professional (such as an insurance adjuster) to conduct a manual on-site survey and determine a repair plan for a damaged vehicle. After the professional captures images of the damaged vehicle, these "captured images" can be compared against similar images in a library or database of images. The library can include images of damaged vehicle parts, which were previously captured from other images of other damaged vehicles ("library images"). In a conventional vehicle damage assessment approach, a system can determine the damage assessment result of the damaged vehicle based on the comparison of the captured images with the library images.

However, conducting a manual survey and determining a repair plan based on the comparison of the captured images against library images can result in a long processing time, and can incur a significant cost in manpower and training of professionals. Current approaches can use image-based artificial intelligence and machine learning in vehicle damages assessment approaches that may reduce both processing time and labor costs. For example, these approaches can enable automatic identification of damaged parts and the degree of the damage based on pictures of a vehicle taken by users at the site of an accident or other incident. In addition, the on-site pictures of the vehicle can be used by computer-vision image identification technology with artificial intelligence to provide a repair solution. Therefore, by automating the survey and damage assessment approaches, the labor costs incurred by a vehicle insurance company can be reduced and the vehicle insurance claiming experience of a user can be improved.

While using the automated survey and damage assessment approach can result in some benefits, some challenges still remain in providing accurate identification or recognition of vehicle parts and the degree of damage of those parts.

SUMMARY

One embodiment facilitates a computer system for recognizing parts of a vehicle. During operation, the system generates a convolution feature map of an image of the vehicle. The system determines, based on the convolution feature map, one or more proposed regions, wherein a respective proposed region corresponds to a target of a respective vehicle part. The system determines a class and a bounding box of a first vehicle part corresponding to a first proposed region based on a feature of the first proposed region. The system optimizes classes and bounding boxes of the vehicle parts based on correlated features of the corresponding proposed regions. The system generates a result which indicates a list including an insurance claim item and corresponding damages based on the optimized classes and bounding boxes of the vehicle parts.

In some embodiments, determining the one or more proposed regions is performed by a fully convolutional network. Determining the one or more proposed regions comprises: performing, for a plurality of convolutional mapping positions, a convolutional operation for a respective convolutional mapping position with a sliding window in the convolution feature map; obtaining a feature vector of the respective convolutional mapping position; predicting whether the respective convolutional mapping position comprises a foreground target with respect to a plurality of predetermined anchors based on the feature vector of the respective convolutional mapping position; and predicting a border of a proposed region in the respective convolutional mapping position that corresponds to each anchor.

In some embodiments, the correlated features of the corresponding proposed regions include one or more of: a size of a respective proposed region; a position relationship between the proposed regions; a distance between the proposed regions; and an intersection-over-union ratio of the proposed regions.

In some embodiments, prior to optimizing the classes and the bounding boxes of the vehicle parts based on the correlated features of the corresponding proposed regions: the system obtains the classes and the bounding boxes of the vehicle parts corresponding to the proposed regions; and the system extracts the correlated features of the proposed regions.

In some embodiments, the system determines an energy function and a corresponding probability function of the conditional random field. The system solves the energy function while minimizing the probability function. The energy function comprises: a data term which is based on a probability of each proposed region belonging to each class; and a smoothing term which is based on the correlated features of the proposed regions.

In some embodiments, optimizing the classes and bounding boxes of the vehicle parts is performed by a recurrent neural network. The system solves the energy function while minimizing the probability function by performing multiple iterative operations through the recurrent neural network to obtain an approximation of the probability function. An iterative operation comprises updating the probability of each proposed region belonging to each class based on a pre-trained compatibility matrix. The pre-trained compatibility matrix indicates a probability of compatibility between the classes of the vehicle.

In some embodiments, parameters used to perform the method are jointly trained from end to end based on training samples.

In some embodiments, the parameters which are jointly trained from end to end are trained by the following operations. The system inputs the training samples into a convolution module, wherein the training samples indicate corresponding classes and bounding boxes. The system obtains a prediction result based on the classes and the bounding boxes optimized by the conditional random field module, wherein the prediction result comprises predicted classes and predicted bounding boxes of a plurality of target regions. The system determines a prediction error for the target regions based on the prediction result and the corresponding classes and bounding boxes indicated by the training samples. The system determines a loss function based on the prediction error, wherein the loss function comprises a cross term of the prediction error for the target regions. The system counter-propagates the prediction error based on the loss function by counter-propagating the prediction error of a first target region to a set of target regions correlated with the first target region.

One embodiment facilitates a computer system for recognizing parts of a vehicle. The system comprises a convolution module, a region proposal module, a classification module, a conditional random field module, and a reporting module. The convolution module is configured to generate a convolution feature map of an image of the vehicle. The region proposal module is configured to determine, based on the convolution feature map, one or more proposed regions, wherein a respective proposed region corresponds to a target of a respective vehicle part. The classification module is configured to determine a class and a bounding box of a first vehicle part corresponding to a first proposed region based on a feature of the first proposed region. The conditional random field module is configured to: optimize classes and bounding boxes of the vehicle parts based on correlated features of the corresponding proposed regions; and output on a display screen the image with annotations indicating the optimized classes and bounding boxes of the vehicle parts. The reporting module is configured to generate, based on the image with annotations, a report which indicates a degree of damage to a respective vehicle part.

BRIEF DESCRIPTION OF THE FIGURES

In the figures, like reference numerals refer to the same figure elements.

DETAILED DESCRIPTION

Figure 1:
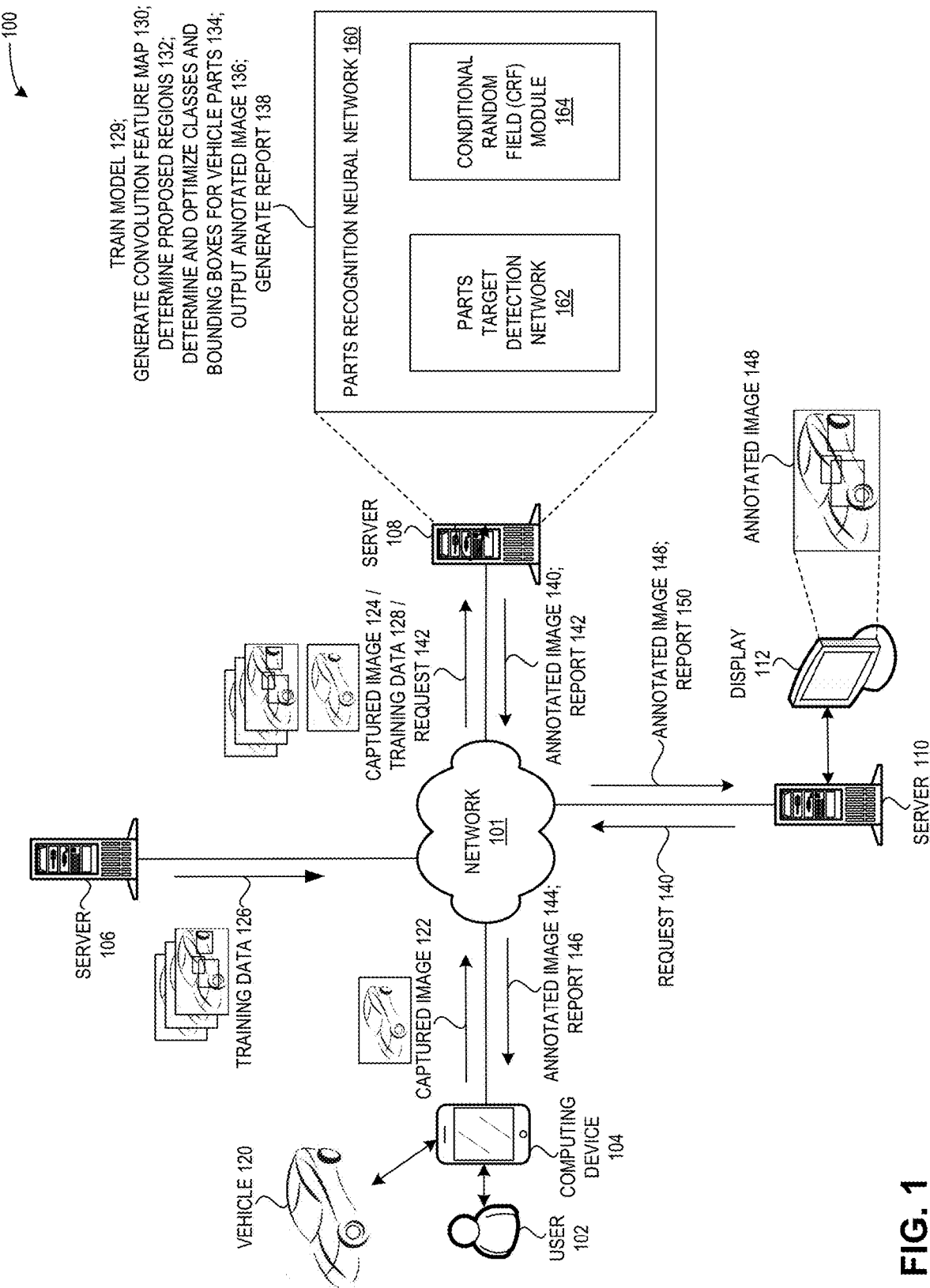
FIG. 1 illustrates an exemplary environment for facilitating recognition of vehicle parts, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein address the challenges of accurately detecting and identifying vehicle parts by training neural network to recognize vehicle parts and by using a target detection algorithm with a conditional random field (CRF). This allows information flow between various proposed target regions of a single vehicle image, which can result in a more accurate classification of a plurality of parts in the single vehicle image.

As described above, sending a professional to capture on-site images of a damaged vehicle and to determine a repair plan may involve subsequently comparing the captured images with "library images." The damage assessment result can be based on the comparison of the captured images with the library images. However, conducting a manual survey and determining a repair plan based on the comparison of the captured images against library images can result in a long processing time, and can incur a significant cost in manpower and training of professionals. Current approaches can use image-based artificial intelligence and machine learning in vehicle damages assessment approaches that may reduce both processing time and labor costs. For example, these approaches can enable automatic identification of damaged parts and the degree of the damage based on pictures of the vehicle taken by users at the site of an accident or other incident. In addition, the on-site pictures of the vehicle can be used by computer-vision image identification technology with artificial intelligence to provide a repair solution. Therefore, by automating the survey and damage assessment approaches, the labor costs incurred by a vehicle insurance company can be reduced and the vehicle insurance claiming experience of a user can be improved.

While using the automated survey and damage assessment approach can result in some benefits, some challenges still remain in providing accurate identification or recognition of vehicle parts and the degree of damage of those parts.

The embodiments described herein address these challenges by providing a system which can be trained to recognize vehicle parts. The system can be a neural network which is trained to recognize a plurality of vehicle parts based on a single vehicle image, such that the system can perform simultaneous detection of multiple vehicle parts (i.e., targets). The system can be trained by using a sample training set of labeled or annotated vehicle images, including images of damaged vehicles and images of undamaged vehicles. The labels or annotations can include both a class of a given part in a vehicle image and a bounding box region where the given part is located.

Once the system has been trained with the sample training set, the system may be considered a "vehicle parts recognition model." Using a target detection algorithm, the trained neural network (or the vehicle parts recognition model) can also use a conditional random field (CRF) to allow information flow between the proposed regions, which results in an improved and more accurate classification of the plurality of vehicle parts. Thus, the system can jointly determine the class of a given vehicle part in a proposed region by combining the correlations between the various proposed regions, which results in optimizing the accuracy of the result of recognizing the vehicle part.

The system can receive as input captured images of vehicles, e.g., images captured onsite by a user on a mobile device with camera function at the scene of an accident, and output a vehicle image with annotations indicating the classes and bounding boxes of multiple vehicle parts in the vehicle image. An exemplary neural network for facilitating recognition of vehicle parts is described below in relation to FIGS. 1 and 2.

Furthermore, based on the annotated image output by the system and based on other annotated images of other vehicle parts, the system can generate a report which indicates a degree of damage to a specific vehicle part, and, generally, a degree of damage to the vehicle. This can result in an improved damage assessment approach which reduces the labor costs incurred by a vehicle insurance company and also increases the efficiency of the user's experience in reporting the damages, e.g., in a claims report or subsequent to an accident. Moreover, the embodiments described herein can provide an improved and more accurate method of damage assessment by clearly labeling (annotating) the captured image with the class and bounding boxes, where the annotations of the class and bounding boxes have been optimized based on the trained neural network model. This can result in a more efficient and accurate understanding of the degree of damages, which can result in an improved vehicle loss assessment report.

The terms "region proposal" and "proposed region" are used interchangeably in this disclosure, and refer to a potential region in which a target part may be detected and located (i.e., recognized).

The terms "module," "component," "layer," and "network layer" are used interchangeably in this disclosure and refer to a structure or unit which is configured to perform the methods described herein.

The terms "neural network," "neural network system," "parts recognition neural network," and "parts recognition neutral network model" are used interchangeably in this disclosure and refer to a model which can be trained using sample images (e.g., supervised data, labeled data, annotated data with class information and bounding boxes, etc).

The terms "parts" and "vehicle parts" are used interchangeably in this disclosure and refer to one or more parts of a vehicle.

The terms "class" or "parts class" are used interchangeably in this disclosure and refer to a category or classification for a part of a vehicle, as determined by the neural network system described herein.

Exemplary Environment and Structure for Facilitating Recognition of Vehicle Parts FIG. 1 illustrates an exemplary environment for facilitating recognition of vehicle parts, in accordance with an embodiment of the present application. Environment 100 can include: a vehicle 120; a user 102 associated with a computing device 104; a server 106; a server 108; and a server 110 associated with a display 112 and a user 114 (not shown). Computing device 104 and servers 106-108 can communicate with each other over a network 101. Server 108 can include a parts recognition neural network 160 (or a model 160), which can include a parts target detection network 162 and a conditional random field (CRF) module 164). Parts recognition neural network 160 is described below in relation to FIG. 2.

During operation, server 106 can send training data 126 to server 108 (as training data 128). Training data 126 can include labeled or annotated vehicle images, including images of damaged vehicles and images of undamaged vehicles. The labels or annotations can include both a class of a given part in a vehicle image and a marked bounding box region in which the given part is located. Server 108 can receive training data 128 and can train parts recognition neural network 160 (function 129). Upon training model 160, server 108 can receive images captured on site (such as a captured image 122) and automatically detect and recognize vehicle parts, which, when combined with damage information, can be used to efficiently generate a vehicle loss assessment report.

For example, computing device 104 can include a camera which can capture images of, e.g., a vehicle 120 which is a damaged vehicle on-site after an accident. Using computing device 104, user 102 can take a picture of vehicle 120, and user 102 (via computing device 104) can send a captured image 122 (of vehicle 120) to server 108 as a captured image 124. Upon obtaining captured image 124, server 108 can convolve and process captured image 124, and can generate a convolution feature map (function 130). Server 108 can determine, based on the convolution feature map, one or more proposed regions, where a proposed region corresponds to a target of a vehicle part (function 132). Server 108 can determine and optimize classes and bounding boxes for the vehicle parts (function 134). Subsequently, server 108 can output on a display screen the image with annotations (e.g., annotated images 148 on display 112 associated with server 110). The image with annotations can indicate the optimized classes and bounding boxes of the vehicle parts (function 136). Server 108 can generate, based on the image with annotations, a report which indicates a degree of damage to a respective vehicle part (e.g., a vehicle loss assessment report) (function 138). The generated report can indicate a degree of damage to the detected and identified vehicle parts, and can also provide a repair plan for the damaged vehicle parts. The generated report can include, e.g., information about the detected and identified parts and a repair plan for fixing those parts.

Server 108 can send an annotated image 140 and a report 142 back to computing device 104 (as an annotated image 144 and a report 146), which can be used to display various items and images on a display screen of computing device 104, e.g., based on specific application scenarios.

In addition, server 110 can send a request 140 to server 108. Request 140 can be, e.g.: a request for all vehicle loss assessment reports generated within a predetermined period of time; a request for a vehicle loss assessment report or a repair plan specific to a particular user, time, or time interval; a request for information about parts relating to a particular vehicle or user or captured image. Server 108 can receive request 140 as a request 142, and, subsequent to performing functions 130-138 (as described above), server 108 can send annotated image 140 and report 142 back to server 110 (as an annotated image 148 and a report 150). Upon receiving annotated image 148 and report 150, server 110 can display, on its display 112, annotated image 148 of previously captured image 122. Annotated image 148 can indicate the optimized classes and bounding boxes of a plurality of vehicle parts of the vehicle in captured image 122. As described above, computing device 104 can also display, on its respective display screen, annotated image 144 and report 146.

Server 110 may also receive annotated image 148 and report 150 automatically, e.g., at a predetermined time or time interval and/or without first sending request 140. A user 114 (not shown) associated with display 112 can view this information on display 112, and can use the information to conduct further actions, e.g., based on the received information being integrated into a damage assessment application or program (not shown) running on server 108 or 110.

Figure 2:
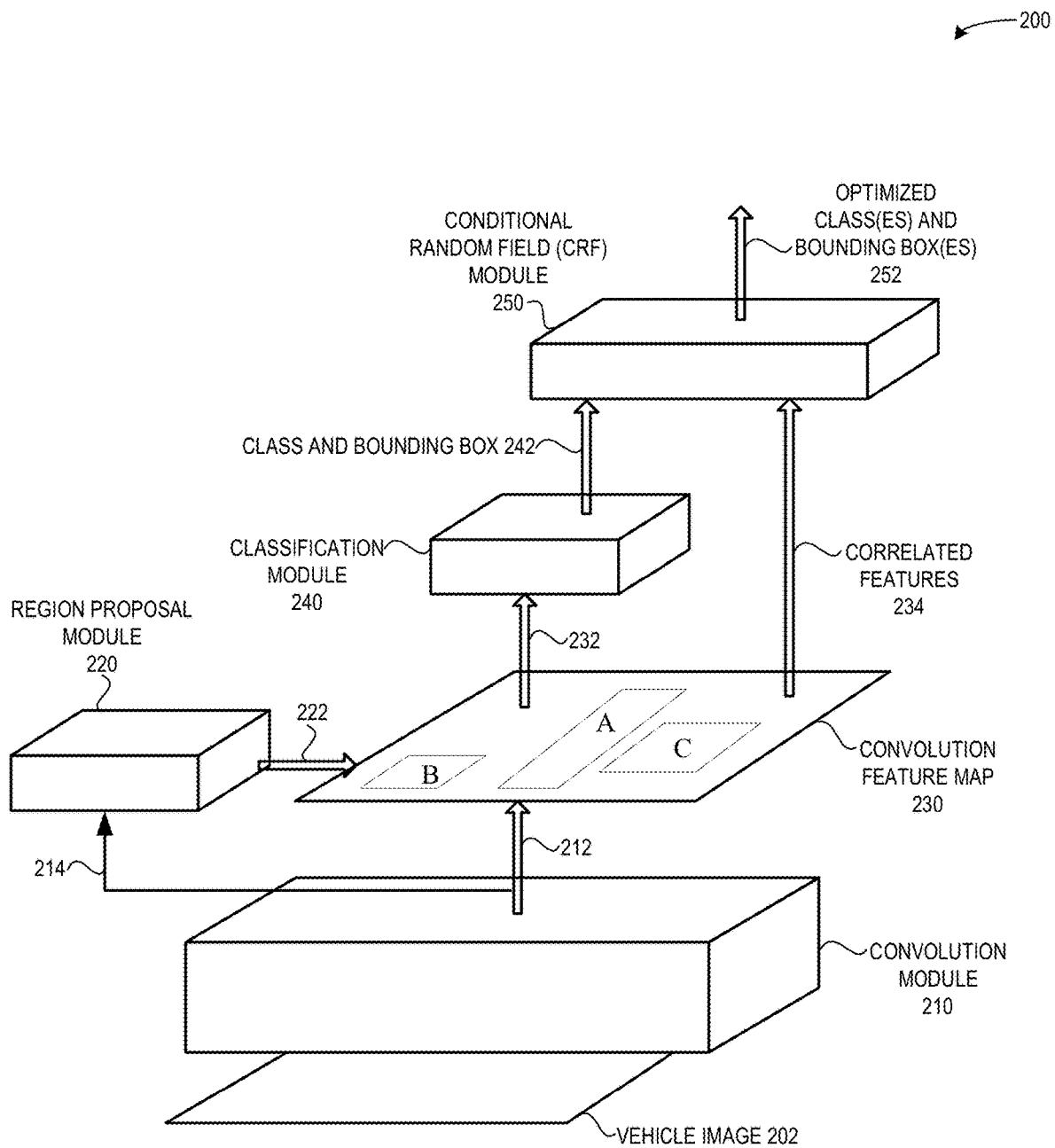
FIG. 2 illustrates an exemplary structure or neural network system for facilitating recognition of vehicle parts, in accordance with an embodiment of the present application.

FIG. 2 illustrates an exemplary structure or neural network system 200 for facilitating recognition of vehicle parts, in accordance with an embodiment of the present application. System 200 can include a convolution module 210, a region proposal module 220, a classification module 240, and a conditional random field (CRF) module 250. Each module can be a network layer or a component of the overall neural network system. During operation, convolution module 210 can receive a vehicle image 202. Convolution module 210 can convolve and process vehicle image 202, and generate a convolution feature map 230 of vehicle image 202 (via a communication 212).

Convolution module: Convolution module 210 can be a Convolutional Neural Network (CNN), which is a network structure frequently adopted in image processing. A CNN can include a plurality of convolution layers, which are used to convolve and process images. A convolution core may be utilized to perform a series of operations with respect to each pixel in an image. The convolution core can be based on a matrix (e.g., a pixel matrix of the image), and can be a grid structure of a square shape (e.g., a 3×3 matrix or pixel region) where each grid can have a weighted value. When performing a convolution calculation with respect to an image, the convolution core can slide on the pixel matrix of the image. For each step of the slide, the system can perform a multiplication and summation for each element in the convolution core and the corresponding pixel value. This can result in a new feature value matrix, which can be used to form the convolution feature map (e.g., convolution feature map 230), which can be transmitted to a classification module 240 via communications 212 and 232.

The convolution calculation can also extract the abstract features from the pixel matrix of the original image. Based on the design of the convolution core, these abstract features may reflect the overall features of the image, e.g., the line shape, the distribution of color, any patterns of shading, etc. As described above, convolution module 210 can include one or more convolution layers, where each convolution layer can perform a convolution processing once with respect to an image. After the convolution layers have successfully completed performing their respective convolution processing operations, the system can obtain convolution feature map 230 which corresponds to vehicle image 202.

In one example, convolution module 210 can include a plurality of convolution layers, and can further include at least one Rectified Linear Unit (ReLU) activating layer between the convolution layers or after certain convolution layers, for non-linear mapping of the output result of the convolution layers. The result from the non-linear mapping may be input into the next convolution layer to continue the convolution operation, or may be output as convolution feature map 230.

In another example, convolution module 210 can include a plurality of convolution layers, and can further include a pooling layer between the convolution layers, for a pooling operation on the output result of the convolution layers. The result from the pooling operation may be input into the next convolution layer to continue the convolution operation.

Region proposal module: Region proposal module 220 can receive convolution feature map 230 (via a communication 214). Region proposal module 220 can determine, based on convolution feature map 230, one or more proposed regions, wherein a respective proposed region corresponds to a target of a respective vehicle part. That is, a proposed region is the region where the target in the image could possibly appear. The proposed region may also be referred to as the region of interest (ROI). The determination of the proposed regions can provide a basis for the subsequent classification of the targets and the regression of the bounding boxes. Exemplary proposed regions A, B, and C are indicated on convolution feature map 230 (via a communication 222).

Region proposal module 220 can be a fully convolutional network, such as a region Convolutional Neural Network (R-CNN) and a Fast R-CNN. In order to extract or determine the proposed regions, the system can adopt a selective search method in both the R-CNN model and the Fast R-CNN model. The advanced Faster R-CNN model can also be used for generating or suggesting the proposed regions. As a fully convolutional network, region proposal module 220 can effectively realize the suggestion and generation of the proposed regions based on convolution feature map 230 as returned by a basic network (i.e., including the convolution module 210) and through a full convolution. An exemplary region proposal module is described below in relation to FIG. 3.

Classification module: Classification module 240 can receive convolution feature map 230 and the generated results from region proposal module 220 based on the convolution feature map 230, e.g., as input to classification module 240 (via a communication 232). Classification module 240 can determine the class and the bounding box of a respective vehicle part of the image, for each proposed region and based on a feature of the proposed region itself.

Classification module 240 can be a fully connected layer, which carries out the classification of the part class and bounding box regression based on the feature of the region for each region input from the previous layer. Specifically, classification module 240 can include a plurality of classifiers, where each classifier is trained to recognize the different classes of targets in the proposed regions. In detecting vehicle parts in vehicle image 202, each classifier can be trained to recognize vehicle parts of different classes, e.g., a bumper, a front door of the vehicle, an engine hood, a headlight, rear lights, etc. Classification module 240 can also include a regressor, which can be used for regressing the bounding box corresponding to the recognized target in order to determine the smallest rectangular region surrounding the recognized target as the bounding box.

Convolution module 210, region proposal module 220, and classification module 240 form the main network structure of the Faster R-CNN. Through this network structure, the system may carry out a preliminary recognition for the input vehicle images (e.g., vehicle image 202), which results in labeling the class of the part and the bounding box of the region where the part is located.

As described herein, classification module 240 can determine the class and bounding box of the vehicle part in a proposed region based on the feature of each proposed region itself. In other words, each proposed region is separately considered and independently processed. For example, given proposed region A as illustrated convolution feature map 230 in FIG. 2, classification module 240 can extract the feature of proposed region A, and can determine whether the target in proposed region A is a certain pre-trained part class based on the extracted feature. If it is, the system can output the class label and bounding box of the target in region A as the predicted result. While performing this determination (e.g., parts detection and recognition) for proposed region A, the system considers only the feature of proposed region A, and does not consider the other proposed regions. Thus, the system can output this preliminary recognition result of the vehicle part through the Faster R-CNN network structure.

Furthermore, a positional relationship between the parts can determine the mutual constraint relations between the classes for the parts. By adding a conditional random field (CRF) module to the neural network of system 200, the system can rectify and optimize the preliminary recognition result obtained by classification module 240, e.g., by capturing and processing the associated features between the proposed regions, thereby further increasing the accuracy of detecting the vehicle parts. The CRF module is described below in further detail.

Conditional Random Field (CRF) Module

Conditional random field (CRF) module 250 can receive both class and bounding box 242 from classification module 240 and can extract correlated features 234 from convolution feature map 230. Correlated features 234 include the associated relations of the plurality of proposed regions from convolution feature map 230. This allows conditional random field module 250 to establish a random field between the parts, which allows the information between the various proposed regions to mutually flow. The class of a given proposed region may be jointly determined based on the features of the surrounding proposed regions, which can result in rectifying and optimizing the part class result of each proposed region.

Specifically, the conditional random field (CRF) can be a probability model of an undirected graph, with the vertex representing a variable, and the edge between the vertexes representing the dependent relationship between two variables. An overall normalization may be carried out for all the variable features to obtain an overall optimization.

In the image processing field, the CRF may be used for semantic segmentation of the images. An image may be considered as a set of pixels, and a segmentation of the image can be used to determine the class label to which each pixel belongs. The image may be mapped to an undirected graph, with each vertex of the image model corresponding to one pixel. In performing segmentation of the image, a hidden variable Xi may be defined as the classification label of pixel i, and its value range can the semantic label L={l1, l2, l3. . . } to be classified. Yi may be defined as an observed value of each random variable Xi, which is the color value of each pixel. An energy function E(x) and a corresponding probability function P of the CRF are defined based on these terms.

The energy function of image segmentation can include a data term and a smoothing term. The data term can be based on the probability of each pixel belonging to each class, and the smoothing term can be based on the energy between the pixel pairs, e.g., the difference of grey scale values and the spatial distance. The purpose of image semantic segmentation of a conditional random field is to minimize the energy function E(x), which corresponds to the maximization of posterior probability function P. The class label obtained for each pixel at this point can correspond to the optimum segmentation result.

In the embodiments described herein, by applying CRF in image segmentation, a system for detecting and recognizing vehicle parts can be optimized by using the conditional random field (CRF) module or component. The essential concept is that when performing image segmentation, the CRF component may obtain a more accurate pixel level segmentation (i.e., which pixel belongs to which class) by: capturing the positional relationship and correlation between the pixels (represented by the presence of the smoothing term in the energy function); and utilizing certain information around the pixel.

Part detection and image segmentation differ in that, for part segmentation the system must determine which pixel belongs to which part, while for part detection the system need only determine which region belongs to which part, without the need to know the class for each pixel. Thus, by applying the method of image segmentation, the system can capture the correlation between the detection boxes of the region proposals, and can also utilize the features of the surrounding proposed regions, which can result in more accurately detecting and determining the class of the parts in each of the proposed regions.

Thus, when using the CRF component to optimize detection of vehicle parts, the CRF energy function is defined as described above, e.g., including a data term and smoothing term, where the data term is based on the probability of each proposed region belonging to each part class (e.g., from class and bounding box information 242), and where the smoothing term is based on the correlated features between the various proposed regions (e.g., based on correlated features 234). The system can determine the probability function of the conditional random field based on the energy function, and can obtain the probability of each proposed region of the energy function belonging to each part class, when the probability function is minimized.

As an example, the CRF component can realize an update of the parts recognition result output from the classification regression layer of the Faster R-CNN, for the pre-established model, and by solving the above-noted probability function and energy function.

As another example, the CRF component can be realized through a recurrent neural network (RNN), i.e., a CRF component as a RNN component. Thus, the CRF component can become a learnable, trainable network component, which may be directly embedded into an already known network model.

Specifically, in the CRF as RNN model, the energy function E(x) may be defined as:

$$E(x) = \Sigma_i \psi_u(x_i) + \Sigma_{i \neq j} \psi_p(x_i, x_j) \qquad \text{Equation (1)}$$

wherein $\psi_u(x_i)$ is the data term which represents the probability of each region proposal xi belonging to the corresponding part class, and wherein $\psi_p(x_i, x_j)$ is a smoothing term which represents the correlated feature between the region proposals xi and xj. More specifically, the smoothing term may be represented as the sum of a plurality of Gaussian functions.

In one example, the correlated features between the various region proposals can include one or more of: the size of the proposed region; a positional relationship between the various proposed regions; a distance between the various proposed regions; and an intersection-over-union (IoU) ratio between the various proposed regions. The system can determine the above noted smoothing term based on these correlated features.

Based on the above noted energy function of Equation (1), the probability function of the conditional random field (CRF) may be determined as:

$$P(X = x | I) = \frac{1}{Z} \exp(-E(x|I)) \qquad \text{Equation (2)}$$

The minimization with respect to the energy function E(x) in Equation (1) can correspond to the maximization of posterior probability function P(x), so as to obtain an optimum parts detection result.

Because it can be difficult to directly calculate the probability function P(x), the system can obtain an approximation of P(x) through a probability function Q(x), which can be more convenient to calculate.

$$Q(X) = \Pi_i Q_i(X_i) \qquad \text{Formula (3)}$$

Q(X) may be allowed to be an approximation of P(x) to the largest extent, through the iterative computation method.

Due to the time sequence characteristics and memory characteristics of the recurrent neural network (RNN), an iteration calculation process may be realized through the network layer in the RNN. The iteration calculation can include multiple iteration operations. Each iteration operation can include a message delivery, a filter weight output, a conversion of class compatibility, an addition of a data term, and a normalization of the probability.

Specifically, under the circumstance when the CRF as RNN component is applied in the vehicle parts recognition, in the step of converting the class compatibility, the system can update the probability of each proposed region belonging to each class via a compatibility matrix. The compatibility matrix may indicate the probability of the compatibility between various vehicle part classes. For example, if part A is the door handle, and if the adjacent part is a vehicle door, then the compatibility probability between the two corresponds to a higher value. However, if part A is the door handle, and if the adjacent part is a bumper, then the compatibility probability between the two corresponds instead to a low value. The compatibility probability value in the compatibility matrix may be obtained through pre-training. That is, the positional relationship and compatibility relationship between various parts in the same vehicle may be learned through training with a large number of images with marked vehicle parts, and the learned positional relationship may be represented by the compatibility probability value in the compatibility matrix.

Thus, the system can perform a continuous iteration operation for approximation of the probability function P(x), and can determine the probability of each proposed region belonging to each corresponding part when the probability function P(x) is maximized. As a result, the system can optimize the result of the parts detection and recognition.

In summary, in the embodiments described herein, the system can: establish a conditional random field (via the CRF component) on the convolution feature map; extract the correlated features between various proposed regions; allow the flow of energy and feature information between different proposed regions; and jointly determine the part class of a certain proposed region based on a plurality of proposed regions. Thus, this can result in optimizing the result of detecting and recognizing vehicle parts based on a single proposed region independently in the previous network layer, which in turn can improve the accuracy of parts recognition.

Region Proposal Module and Exemplary Anchors

Figure 3:
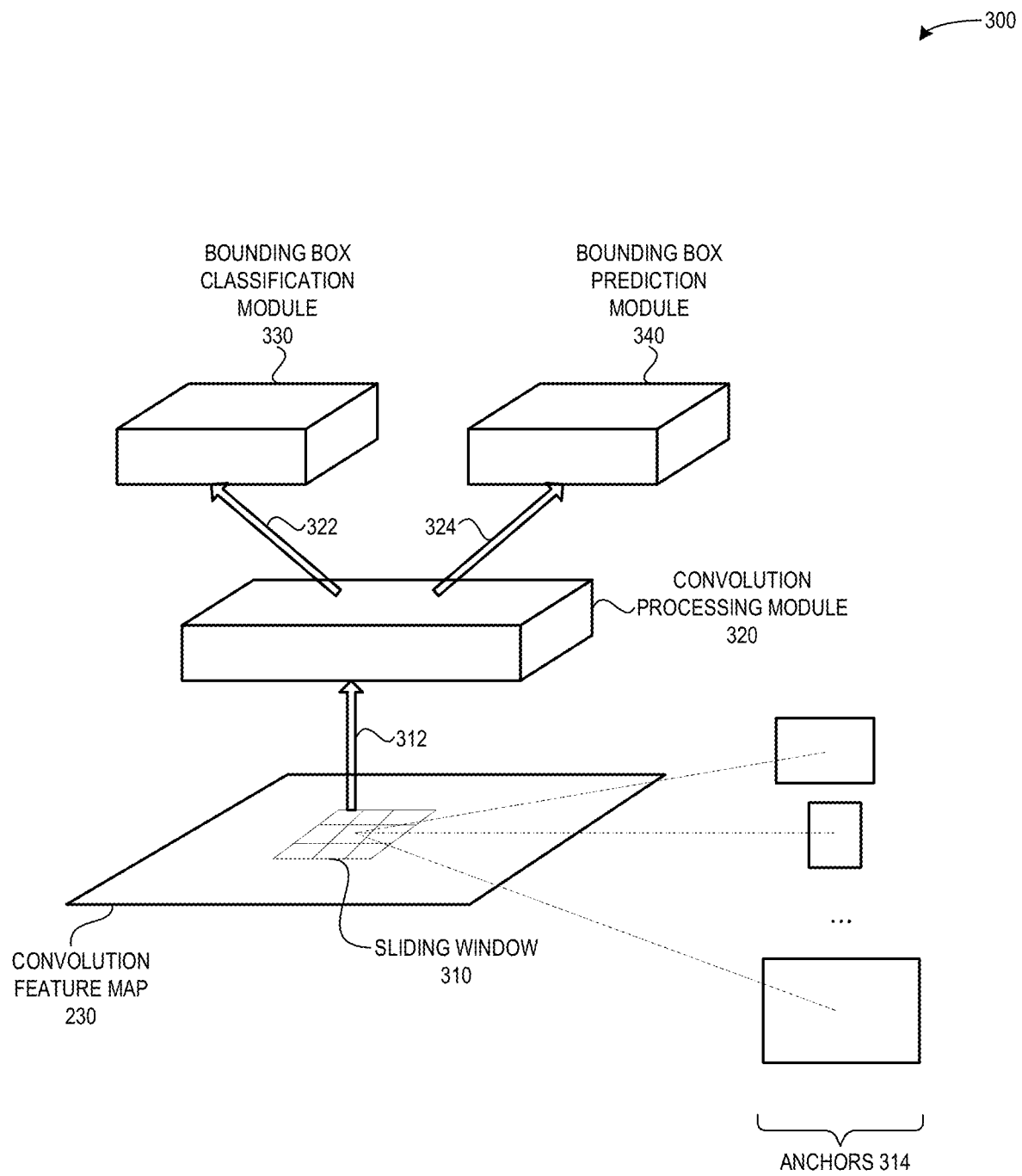
FIG. 3 illustrates an exemplary structure of a region proposal module or network for facilitating recognition of vehicle parts, in accordance with an embodiment of the present application.

FIG. 3 illustrates an exemplary structure of a region proposal module or network 300 for facilitating recognition of vehicle parts, in accordance with an embodiment of the present application. Region proposal module 300 can correspond to region proposal module 220 of FIG. 2. Region proposal module 300 can include a convolution processing module 320, a bounding box classification module 330, and a bounding box prediction module 340. Convolution processing module 320 can be configured to perform convolutional operator processing with respect to each convolutional mapping position with a sliding window in the convolution feature map output from the previous convolution layer. Convolution processing module 320 can further be configured to obtain a feature vector of each convolution mapping position.

Convolution processing module: In convolution processing module 320, a small network (similar to the convolution core) can be used to perform slide scanning on the convolution feature map output from the previous convolution layer (e.g., convolution feature map 230). This sliding window 310 can be in full contact with a box of a certain size on the feature map each time (similar to the convolution operator), and can then be mapped to a reduced dimension (i.e., as the feature vector of the center position of this box).

Region proposal module 300 can use the concept of an "anchor." As described herein, the purpose of performing scanning by using the sliding window to slide over each position is to determine whether a target is present in the receptive field corresponding to the center of each sliding window. As the sizes and length/width ratios of the targets are different, boxes of many different sizes may be required. The anchor can provide the size of a standard box, and the system can obtain boxes of different sizes based on the multiplied times (sizes) and the length/width ratios. One example can be seen in setting the size of the standard box as 16, and using boxes of three multiplied times (8, 16 and 32) and based on three ratios (0.5, 1 and 2). This can result in a total of nine anchors of different sizes (such as anchors 314), as described below in relation to FIG. 4.

Figure 4:
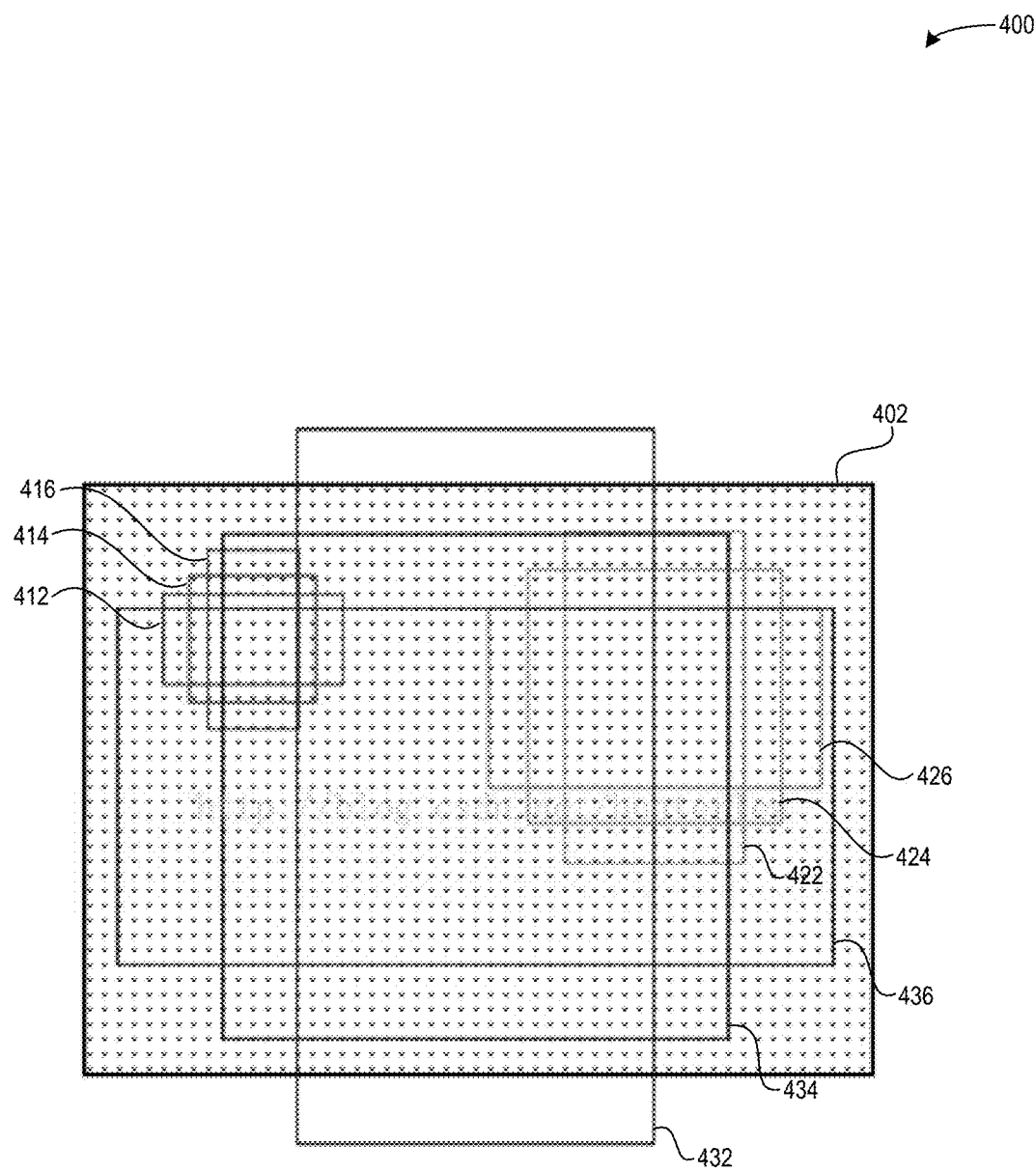
FIG. 4 illustrates a diagram of exemplary anchors in nine sizes, in accordance with an embodiment of the present application.

FIG. 4 illustrates a diagram of exemplary anchors 400 in nine sizes, in accordance with an embodiment of the present application. Note that in order to clearly illustrate the anchors of various sizes, the centers of the anchors depicted in FIG. 4 do not correspond to the same position.

Each anchor (e.g., 412-416, 422-426, and 432-436) can correspond to a box of a different size in the original image, while the sliding window for performing the convolution calculation can act upon the convolution feature map. Each convolution mapping position (depending on the times of the convolution processing and the size of the convolution core in each processing) of the convolution feature map can correspond to a bigger region in the original image. For example, an entire region 402 may act upon the pixel region of the original image corresponding to one sliding window on the convolution feature map, and the anchors can be the boxes of various sizes (e.g., 412-416, 422-426, and 432-436) marked with bounding boxes that adopt the position on the original image corresponding to the center point of the sliding window (convolution core) as the center.

The system can perform processing with the sliding window by sliding across each position to obtain the feature vector corresponding to each position. The system can input the feature vector into bounding box classification module 330 and bounding box prediction module 340 (via, respectively, communications 322 and 324).

Bounding box classification module: Returning to FIG. 3, bounding box classification module 330 can be configured to predict whether each position constitutes or includes a foreground target with respect to the various predetermined anchor points based on the feature vector of each convolutional mapping position. Bounding box classification module 330 can output an objectness score of a certain anchor with respect to each convolutional mapping position, where the objectness score can indicate the probability of the current anchor being the foreground target with respect to a given convolutional mapping position. The objectness score may be used for distinguishing whether the given convolutional mapping position is or is not the target, rather than as a classification of the target itself.

Bounding box prediction module: Bounding box prediction module 340 can be configured to predict the border of the region in each position that corresponds to each anchor. Bounding box prediction module 340 can output the regression borders of a plurality of proposed regions of various sizes and length/width ratios at each given convolutional mapping position. Therefore, in FIG. 4, given nine anchors of different sizes, for each position, bounding box prediction module 340 can output nine regression borders.

By combining the results of both bounding box classification module 330 and bounding box prediction module 340, region proposal module 300 of FIG. 3 (i.e., region proposal module 220 of FIG. 2) can directly generate a plurality of proposed regions with the vehicle parts as the potential targets based on convolution feature map 230.

End to End Joint Training

As described above in relation to FIG. 2, the neural network system for parts detection and recognition is jointly formed by convolution module 210, region proposal module 220, and classification module 240, as well as conditional random field (CRF) module 250. These modules can each be a network portion, such that the overall neural network system can include a plurality of network portions. A network portion, e.g., the CRF module, can act as a sub-network of the overall neural network system. Furthermore, a network portion may be trained independently to determine the parameters for the model.

The system can jointly train the multiple network portions in the neural network system, e.g., by an end to end training with respect to the entire neural network system. Specifically, the joint training from end to end may be carried out through the following method. Training samples can be input into the entire neural network system. A training sample may be an image containing the vehicle parts, where the vehicle parts may have labeled classes and bounding boxes as the ground truth. Convolution module 210 can perform convolution processing on the training sample to obtain the convolution feature map. Region proposal module 220 can determine one or more proposed regions based on the convolution feature map. For all the proposed regions, based on a feature of a respective proposed region, classification module 240 can process the respective proposed region to determine a preliminary class and a preliminary bounding box of a vehicle part corresponding to the respective proposed region. Subsequently, conditional random field (CRF) module 250 can optimize the preliminary result and output the prediction result of the entire network, where the prediction result includes the predicted part classes and predicted bounding boxes of a plurality of target regions.

The system can determine the prediction error of the various target regions based on the predicted result of the network and the ground truth of the training samples (e.g., the part class label and the bounding box label). The system can determine the loss function based on the prediction error. In one example, the loss function includes an intersection term of the prediction error of a plurality of target regions. This corresponds to the prediction result of a certain proposed region, which prediction result is determined based on the correlated features (after establishing correlations between a plurality of proposed regions in the CRF module).

The system can counter-propagate the prediction error based on the loss function, so as to adjust and determine the parameters of the network in the neural network system. Because the loss function can include the intersection term of the prediction error of a plurality of target regions, when a gradient counter-propagation of the error is carried out, the system can counter-propagate the prediction error of a certain target region to the other target regions related to this target region, thereby optimizing the network parameters relevant to the computing of the correlated features of the proposed regions.

Thus, training the system in this manner can result in a deep learning neural network system. This neural network system may simultaneously detect and recognize a plurality of vehicle parts contained in the image, based on a single vehicle image. By using the conditional random field (CRF) and by performing the detection of the parts based on the correlated features between the various proposed regions, the system can take into account the constraint positional relationship between the unique parts of the vehicle in the detection process, which can result in a more accurate detection result.

Exemplary Method for Facilitating Recognition of Vehicle Parts

Figure 5:
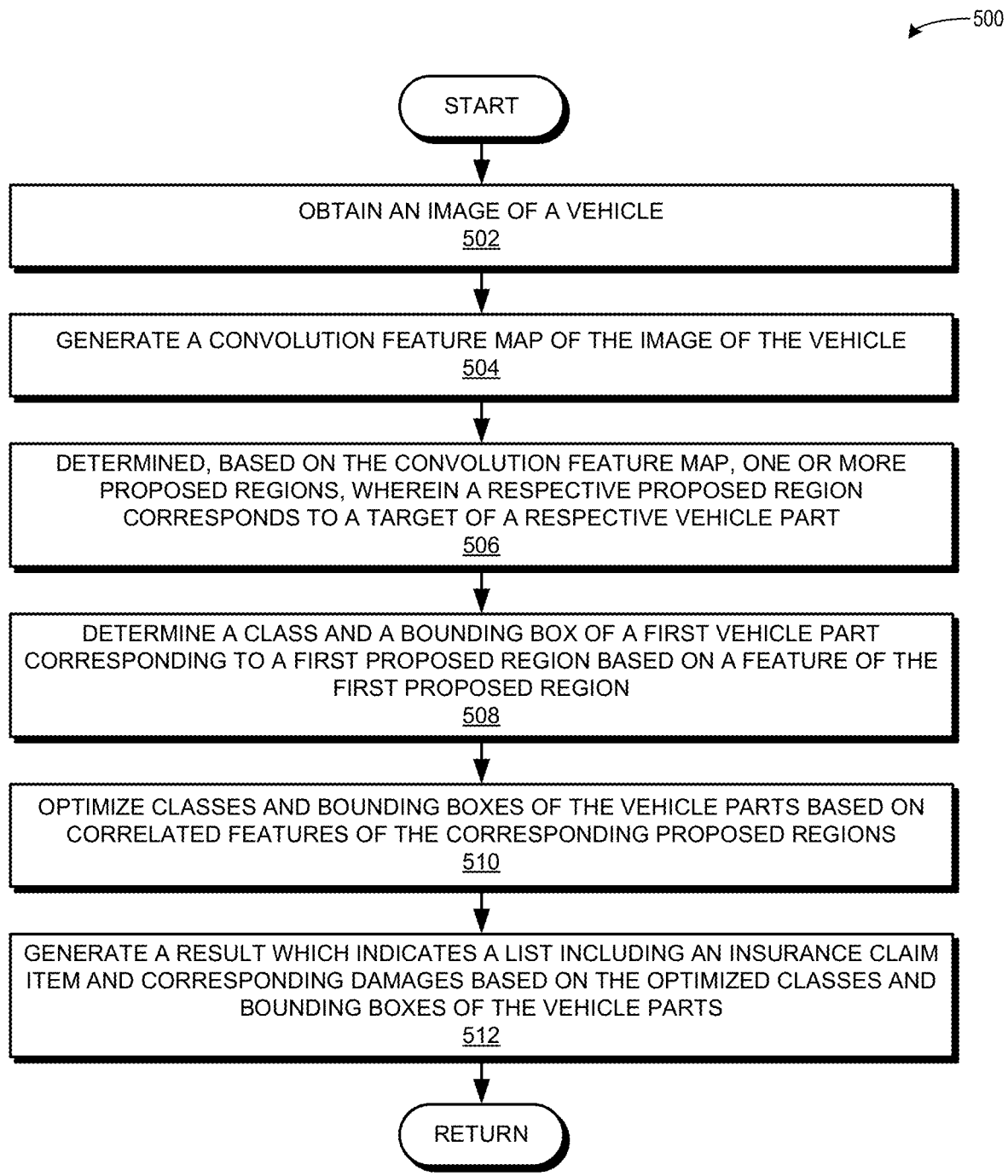
FIG. 5 illustrates an exemplary method for facilitating recognition of vehicle parts, in accordance with an embodiment of the present application.

FIG. 5 illustrates an exemplary method 500 for facilitating recognition of vehicle parts, in accordance with an embodiment of the present application. During operation, the system obtains an image of a vehicle (operation 502). The image can be captured by a user of a mobile device with a camera, and the image can be of a damage vehicle at the site of an accident. The system generates a convolution feature map of the image of the vehicle (operation 504). The system determines, based on the convolution feature map, one or more proposed regions, wherein a respective proposed region corresponds to a target of a respective vehicle part (operation 506). The system determines a class and a bounding box of a first vehicle part corresponding to a first proposed region based on a feature of the first proposed region (operation 508). The system optimizes classes and bounding boxes of the vehicle parts based on correlated features of the corresponding proposed regions (operation 510). The system generates a result which indicates a list including an insurance claim item and corresponding damages based on the optimized classes and bounding boxes of the vehicle parts (operation 512). The system can store the generated result, and use the generated result to produce, e.g., reports. In some embodiments, the system can output on a display screen the image with annotations indicating the optimized classes and bounding boxes of the vehicle parts. The system can generate, based on the image with annotations, a report which indicates a degree of damage to a respective vehicle part. Note that the annotated image is not always necessary for generating the result.

Figure 6A:
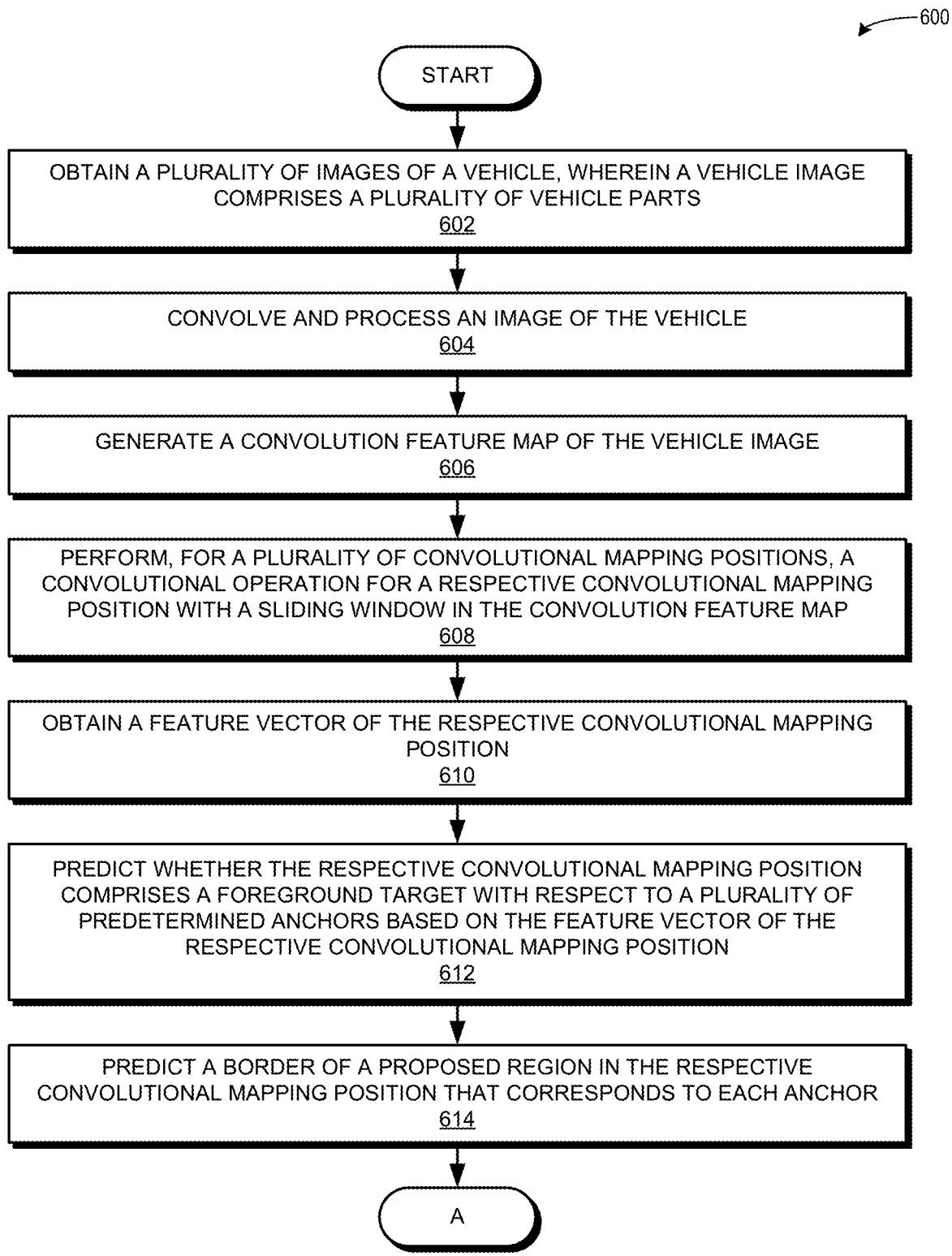
FIG. 6A illustrates an exemplary method for facilitating recognition of vehicle parts, in accordance with an embodiment of the present application.

FIG. 6A illustrates an exemplary method 600 for facilitating recognition of vehicle parts, in accordance with an embodiment of the present application. During operation, the system obtains a plurality of images of a vehicle, wherein a vehicle image comprises a plurality of vehicle parts (operation 602). The system convolves and processes an image of the vehicle (operation 604). The system generates a convolution feature map of the image of the vehicle (operation 606).

The system performs, for a plurality of convolutional mapping positions, a convolutional operation for a respective convolutional mapping position with a sliding window in the convolution feature map (operation 608). The system obtains a feature vector of the respective convolutional mapping position (operation 610). The system predicts whether the respective convolutional mapping position comprises a foreground target with respect to a plurality of predetermined anchors based on the feature vector of the respective convolutional mapping position (operation 612). The system predicts a border of a proposed region in the respective convolutional mapping position that corresponds to each anchor (operation 614). Operations 608 to 614 correspond to operation 506 of FIG. 5. The operation continues at Label A of FIG. 6B.

Figure 6B:
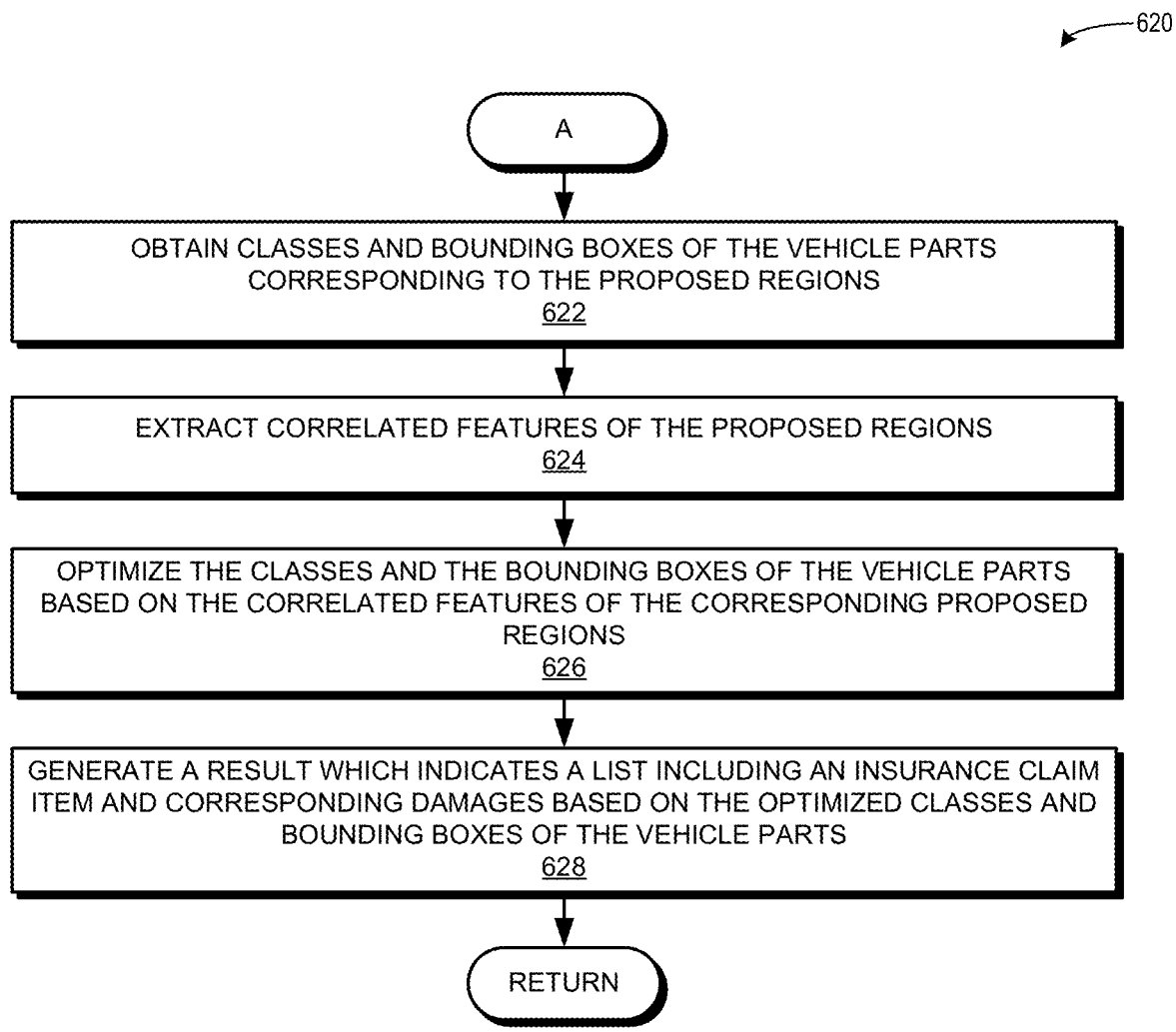
FIG. 6B illustrates an exemplary method for facilitating recognition of vehicle parts, in accordance with an embodiment of the present application.

FIG. 6B illustrates an exemplary method 620 for facilitating recognition of vehicle parts, in accordance with an embodiment of the present application. The system obtains classes and bounding boxes of the vehicle parts corresponding to the proposed regions (operation 622). The system extracts correlated features of the proposed regions (operation 624). The system optimizes the classes and the bounding boxes of the vehicle parts based on the correlated features of the corresponding proposed regions (operation 626). The system generates a result which indicates a list including an insurance claim item and corresponding damages based on the optimized classes and bounding boxes of the vehicle parts (operation 628). In some embodiments, the system can output on a display screen the image with annotations indicating the optimized classes and bounding boxes of the vehicle parts. The system can generate, based on the image with annotations, a report which indicates a degree of damage to a respective vehicle part. As described above, the annotated image is not always necessary for generating the result.

Exemplary Computer System and Apparatus

Figure 7:
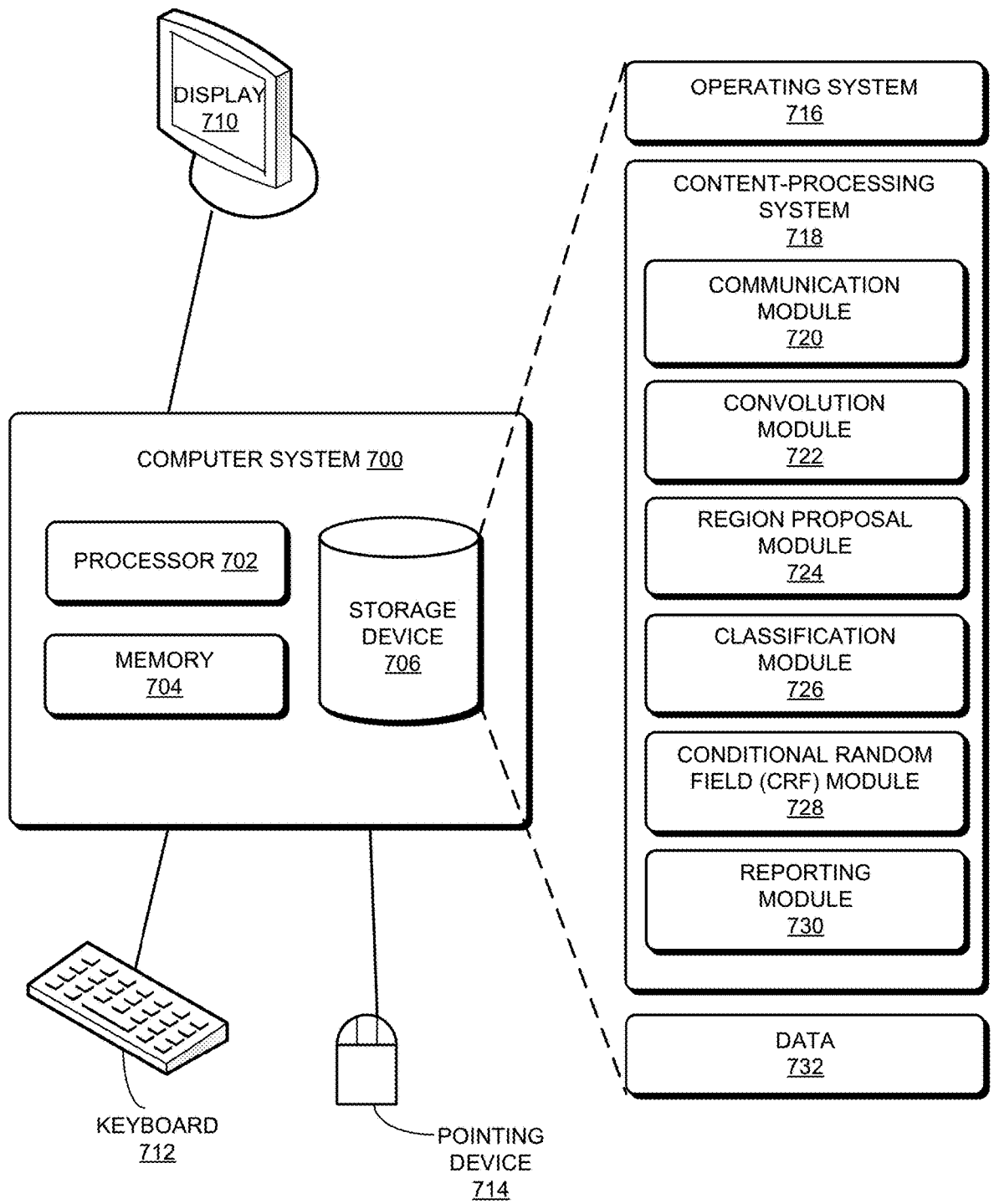
FIG. 7 illustrates an exemplary computer system for facilitating recognition of vehicle parts, in accordance with an embodiment of the present application.

FIG. 7 illustrates an exemplary computer system 700 for facilitating recognition of vehicle parts, in accordance with an embodiment of the present application. Computer system 700 includes a processor 702, a volatile memory 704, and a storage device 706. Volatile memory 704 can include, e.g., random access memory (RAM), that serves as a managed memory, and can be used to store one or more memory pools. Storage device 706 can include persistent storage. Furthermore, computer system 700 can be coupled to a display device 710, a keyboard 712, and a pointing device 714. Storage device 706 can store an operating system 716, a content-processing system 718, and data 732.

Content-processing system 718 can include instructions, which when executed by computer system 700, can cause computer system 700 to perform methods and/or processes described in this disclosure. Specifically, content-processing system 718 can include instructions for receiving and transmitting data packets, including: data to be processed, annotated, classified, and stored; an image; a class; indicators of a bounding box; and a report (communication module 720).

Content-processing system 718 can further include instructions for generating a convolution feature map of an image of the vehicle (convolution module 722). Content-processing system 718 can include instructions for determining, based on the convolution feature map, one or more proposed regions, wherein a respective proposed region corresponds to a target of a respective vehicle part (region proposal module 724). Content-processing system 718 can include instructions for determining a class and a bounding box of a first vehicle part corresponding to a first proposed region based on a feature of the first proposed region (classification module 726). Content-processing system 718 can include instructions for optimizing classes and bounding boxes of the vehicle parts based on correlated features of the corresponding proposed regions (conditional random field (CRF) module 728). Content-processing system 718 can include instructions for generating a result which indicates a list including an insurance claim item and corresponding damages based on the optimized classes and bounding boxes of the vehicle (reporting module 730). Content-processing system 718 can include instructions for outputting on a display screen the image with annotations indicating the optimized classes and bounding boxes of the vehicle parts (via, e.g., an image display module, not shown). Content-processing system 718 can include instructions for generating, based on the image with annotations, a report which indicates a degree of damage to a respective vehicle part (reporting module 730).

Data 732 can include any data that is required as input or generated as output by the methods and/or processes described in this disclosure. Specifically, data 732 can store at least: data; convolved or processed data; an image; a captured image; an image of a part or parts of a vehicle; a predetermined class or classes; an annotated image; a report; a degree of damage to a vehicle part; a convolution feature map; a proposed region; a class; a bounding box; a report; a mapping position; a convolutional operation; a sliding window; a feature vector; a prediction; a foreground target; an anchor; a border; a border of a proposed region; a size; a position relationship; a distance; an intersection-over-union ratio; a correlated feature; an energy function; a probability function; a data term; a smoothing term; a recurrent neural network; an iterative operation; a compatibility matrix; a probability of compatibility between classes; a parameter; a training sample; a prediction result; a prediction area; a loss function; a cross term; a model based on a neural network; a result; and a list including an insurance claim item and corresponding damages;.

Figure 8:
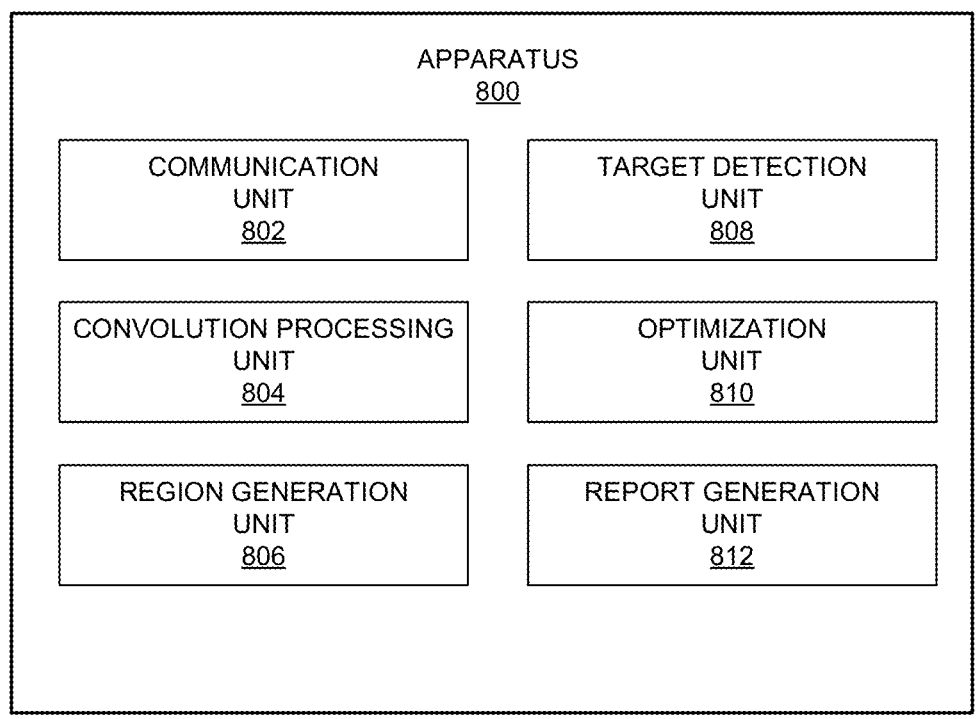
FIG. 8 illustrates an exemplary apparatus for facilitating recognition of vehicle parts, in accordance with an embodiment of the present application.

FIG. 8 illustrates an exemplary apparatus 800 for facilitating recognition of vehicle parts, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device(s) which is/are capable of communicating with other computer systems and/or devices. Specifically, apparatus 800 can comprise units 802-812, which perform functions or operations similar to modules 720-730 of FIG. 7, including: a communication unit 802; a convolution processing unit 804; a region generation unit 806; a target detection unit 808; an optimization unit 810; and a report generation unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for recognizing parts of a vehicle, the method comprising:
    generating a convolution feature map of an image of the vehicle;
    determining, based on the convolution feature map, one or more proposed regions, wherein a respective proposed region corresponds to a target of a respective vehicle part;
    determining a class and a bounding box of a first vehicle part corresponding to a first proposed region based on a feature of the first proposed region;
    optimizing classes and bounding boxes of the vehicle parts based on correlated features of the corresponding proposed regions;
    generating a result which indicates a list including an insurance claim item and corresponding damages based on the optimized classes and bounding boxes of the vehicle parts.

2. The method of claim 1, wherein determining the one or more proposed regions is performed by a fully convolutional network, and wherein determining the one or more proposed regions comprises:
    performing, for a plurality of convolutional mapping positions, a convolutional mapping operation for a respective convolutional mapping position with a sliding window in the convolution feature map;
    obtaining a feature vector of the respective convolutional mapping position;
    predicting whether the respective convolutional mapping position comprises a foreground target with respect to a plurality of predetermined anchors based on the feature vector of the respective convolutional mapping position; and
    predicting a border of a proposed region in the respective convolutional mapping position that corresponds to each anchor.

3. The method of claim 1, wherein the correlated features of the corresponding proposed regions include one or more of:
    a size of a respective proposed region;
    a position relationship between the proposed regions;
    a distance between the proposed regions; and
    an intersection-over-union ratio of the proposed regions.

4. The method of claim 1, wherein prior to optimizing the classes and the bounding boxes of the vehicle parts based on the correlated features of the corresponding proposed regions, the method further comprises:
    obtaining the classes and the bounding boxes of the vehicle parts corresponding to the proposed regions; and
    extracting the correlated features of the proposed regions.

5. The method of claim 1, further comprising:
    determining an energy function and a corresponding probability function of the conditional random field; and
    solving the energy function while minimizing the probability function,
    wherein the energy function comprises:
        a data term which is based on a probability of each proposed region belonging to each class; and
        a smoothing term which is based on the correlated features of the proposed regions.

6. The method of claim 5, wherein optimizing the classes and bounding boxes of the vehicle parts is performed by a recurrent neural network, wherein the method further comprises:
    solving the energy function while minimizing the probability function by performing multiple iterative operations through the recurrent neural network to obtain an approximation of the probability function,
    wherein an iterative operation comprises updating the probability of each proposed region belonging to each class based on a pre-trained compatibility matrix, and
    wherein the pre-trained compatibility matrix indicates a probability of compatibility between the classes of the vehicle.

7. The method of claim 1, wherein parameters used to perform the method are jointly trained from end to end based on training samples.

8. The method of claim 7, wherein the parameters which are jointly trained from end to end are trained by:
    inputting the training samples into a convolution module, wherein the training samples indicate corresponding classes and bounding boxes;
    obtaining a prediction result based on the classes and the bounding boxes optimized by the conditional random field module,
    wherein the prediction result comprises predicted classes and predicted bounding boxes of a plurality of target regions;
    determining a prediction error for the target regions based on the prediction result and the corresponding classes and bounding boxes indicated by the training samples;
    determining a loss function based on the prediction error, wherein the loss function comprises a cross term of the prediction error for the target regions; and
    counter-propagating the prediction error based on the loss function by counter-propagating the prediction error of a first target region to a set of target regions correlated with the first target region.

9. A non-transitory computer-readable storage medium storing instructions that when executed by a computer cause the computer to perform a method, wherein the method comprises:
    generating a convolution feature map of an image of the vehicle;
    determining, based on the convolution feature map, one or more proposed regions, wherein a respective proposed region corresponds to a target of a respective vehicle part;
    determining a class and a bounding box of a first vehicle part corresponding to a first proposed region based on a feature of the first proposed region;

optimizing classes and bounding boxes of the vehicle parts based on correlated features of the corresponding proposed regions;

generating a result which indicates a list including an insurance claim item and corresponding damages based on the optimized classes and bounding boxes of the vehicle parts.

10. The storage medium of claim 9, wherein determining the one or more proposed regions is performed by a fully convolutional network, and wherein determining the one or more proposed regions comprises:

performing, for a plurality of convolutional mapping positions, a convolutional operation for a respective convolutional mapping position with a sliding window in the convolution feature map;

obtaining a feature vector of the respective convolutional mapping position;

predicting whether the respective convolutional mapping position comprises a foreground target with respect to a plurality of predetermined anchors based on the feature vector of the respective convolutional mapping position; and predicting a border of a proposed region in the respective convolutional mapping position that corresponds to each anchor.

11. The storage medium of claim 9, wherein the correlated features of the corresponding proposed regions include one or more of:

a size of a respective proposed region;
a position relationship between the proposed regions;
a distance between the proposed regions; and
an intersection-over-union ratio of the proposed regions.

12. The storage medium of claim 9, wherein prior to optimizing the classes and the bounding boxes of the vehicle parts based on the correlated features of the corresponding proposed regions, the method further comprises:

obtaining the classes and the bounding boxes of the vehicle parts corresponding to the proposed regions; and extracting the correlated features of the proposed regions.

13. The storage medium of claim 9, wherein the method further comprises:

determining an energy function and a corresponding probability function of the conditional random field; and solving the energy function while minimizing the probability function, wherein the energy function comprises:
a data term which is based on a probability of each proposed region belonging to each class; and
a smoothing term which is based on the correlated features of the proposed regions.

14. The storage medium of claim 13, wherein optimizing the classes and bounding boxes of the vehicle parts is performed by a recurrent neural network, and wherein the method further comprises:

solving the energy function while minimizing the probability function by performing multiple iterative operations through the recurrent neural network to obtain an approximation of the probability function, wherein an iterative operation comprises updating the probability of each proposed region belonging to each class based on a pre-trained compatibility matrix, and wherein the pre-trained compatibility matrix indicates a probability of compatibility between the classes of the vehicle.

15. The storage medium of claim 9, wherein parameters used to perform the method are jointly trained from end to end based on training samples.

16. The storage medium of claim 15, wherein the parameters which are jointly trained from end to end are trained by:

inputting the training samples into a convolution module, wherein the training samples indicate corresponding classes and bounding boxes;

obtaining a prediction result based on the classes and the bounding boxes optimized by the conditional random field module, wherein the prediction result comprises predicted classes and predicted bounding boxes of a plurality of target regions;

determining a prediction error for the target regions based on the prediction result and the corresponding classes and bounding boxes indicated by the training samples;

determining a loss function based on the prediction error, wherein the loss function comprises a cross term of the prediction error for the target regions; and counter-propagating the prediction error based on the loss function by counter-propagating the prediction error of a first target region to a set of target regions correlated with the first target region.

17. A computer system for recognizing parts of a vehicle, the system comprising:

a convolution module configured to generate a convolution feature map of an image of the vehicle;

a region proposal module configured to determine, based on the convolution feature map, one or more proposed regions, wherein a respective proposed region corresponds to a target of a respective vehicle part;

a classification module configured to determine a class and a bounding box of a first vehicle part corresponding to a first proposed region based on a feature of the first proposed region;

a conditional random field module configured to optimize classes and bounding boxes of the vehicle parts based on correlated features of the corresponding proposed regions; and a reporting module configured to generate a result which indicates a list including an insurance claim item and corresponding damages based on the optimized classes and bounding boxes of the vehicle parts.

18. The computer system of claim 17, wherein the region proposal module is a fully convolutional network, comprising:

a convolution processing module configured to:
perform, for a plurality of convolutional mapping positions, a convolutional operation for a respective convolutional mapping position with a sliding window in the convolution feature map; and
obtain a feature vector of the respective convolutional mapping position;

a bounding box classification module configured to predict whether the respective convolutional mapping position comprises a foreground target with respect to a plurality of predetermined anchors based on the feature vector of the respective convolutional mapping position; and a bounding box prediction module configured to predict a border of a proposed region in the respective convolutional mapping position that corresponds to each anchor.

19. The computer system of claim 17, wherein the conditional random field module is further configured to, prior to optimizing the classes and bounding boxes of the vehicle parts based on the correlated features of the corresponding proposed regions:
  obtain the classes and bounding boxes of the vehicle parts corresponding to the proposed regions; and
  extract the correlated features of the proposed regions.

20. The computer system of claim 17, wherein the conditional random field module is further configured to:
  determine an energy function and a corresponding probability function of the conditional random field; and
  solve the energy function while minimizing the probability function,
  wherein the energy function comprises:
    a data term which is based on a probability of each proposed region belonging to each class; and
    a smoothing term which is based on the correlated features of the proposed regions.

\* \* \* \* \*